United States Patent [19]

Campbell

[11] 4,439,675
[45] Mar. 27, 1984

[54] MOISTURE AND DENSITY GAUGE

[76] Inventor: Patrick J. Campbell, 130 S. Buchanan Cir., Pacheco, Calif. 94553

[21] Appl. No.: 304,563

[22] Filed: Sep. 21, 1981

[51] Int. Cl.³ .............................................. G01V 5/00
[52] U.S. Cl. .................................. 250/253; 250/358.1
[58] Field of Search ............... 250/253, 254, 255, 269, 250/358.1

[56] References Cited

U.S. PATENT DOCUMENTS 3,428,806 2/1969 Wack ................................... 250/253
3,544,793 12/1970 Bless et al. ...................... 250/253 X
3,864,569 2/1975 Tittman ........................... 250/269 X Primary Examiner—Davis L. Willis
Attorney, Agent, or Firm—Bielen and Peterson

[57] ABSTRACT

A moisture and density gauge which combines sources of gamma and neutron radiation in a casing which is placed in the medium being analyzed. The gauge includes detectors for the gamma and neutron radiation being placed in end to end configuration within the casing such that the neutron detector is placed between the gamma radiation detector and the source of gamma radiation.

9 Claims, 1 Drawing Figure

MOISTURE AND DENSITY GAUGE

BACKGROUND OF THE INVENTION

The present invention relates to a novel moisture and density gauge for a medium.

It is known that sources of neutron and gamma radiation may be used to establish the moisture and density of media such as soils. The prior techniques involve the use of drilling a hole in the soil and inserting a probe which included the source of radiation and a detector of the same which would send a signal to the surface for transformation into a determination of the moisture and density of the medium.

Recent devices have employed "end to end" density and moisture measurement devices having the neutron and gamma radiation sources in the center of the same with the moisture and density detectors extending in either direction therefrom. Such a device is now being manufactured by the CPN Corp. of Pacheco, California. To obtain density and moisture measurements the probe containing the sources and detectors would be lowered to two distinct depths in the soil to effect both measurements. This technique was time consuming and introduced the possibility of error in not obtaining both measurements for the same depth.

A device simplifying the combined moisture and density measurement for a certain depth in a medium would be an advance in the art of analyzing soils using radioactive sources.

SUMMARY OF THE INVENTION

In accordance with the present invention a novel and useful moisture and density gauge employing a probe which is lowered to a certain depth in the medium is provided.

The moisture and density gauge of the present invention employs a source of gamma radiation and a source of neutron radiation. Both sources may be combined into a single source in pelletized form. A means is provided for receiving signals which may be transformed into a representation of the moisture and density of the medium. This means may take the form of a dual channel amplifier having display capabilities.

The probe providing the signals to the amplifier may include a casing with the gamma and neutron radiation sources being placed therewithin. A casing is positioned within the medium such as a soil by lowering the same into a predrilled hole.

In addition, the casing includes means for detecting and signalling the gamma and neutron radiation after interaction of the same with the surrounding medium. Such means may take the form of gamma radiation and neutron detectors which are known in the art. The neutron detector is placed in the casing between the gamma radiation detector and the source of gamma radiation in end-to-end configuration. In this way, the user need only lower the probe to a single depth in relation to the surface of the soil in order to obtain readings of the moisture of the soil at that depth.

The gamma radiation source may also include a shield surrounding the same and having a aperture for controlling the control of gamma radiation from the source within the casing.

The gauge of the present invention also embraces the use of means for amplifying, or preamplifying, the signals obtained from the gamma and neutron radiation detectors. Such a preamplifier may be placed within the casing and lowered to the soil. The present invention may be deemed to include a novel method for obtaining moisture and density data for a medium such as a soil.

It may be apparent that a novel and useful moisture and density gauge and method for obtaining moisture and density readings has been described.

It is therefore an object of the present invention to provide a moisture and density gauge which permits the simultaneous measurements of moisture and density of a medium by the lowering of a probe having neutron and gamma radiation sources therewithin to a certain depth in the medium.

It is another object of the present invention to provide a moisture and density gauge which includes a probe that is compact and easy to handle in the field.

It is yet another object of the present invention to provide a moisture and density gauge which obtains data readings quickly and accurately.

It is yet another object of the present invention to provide a moisture and density gauge which operates with a combination of neutron and gamma source using backscatter techniques.

The invention possesses other objects and advantages especially as concerns particular characteristics and features thereof which will become apparent as the specification continues.

Figure 1:
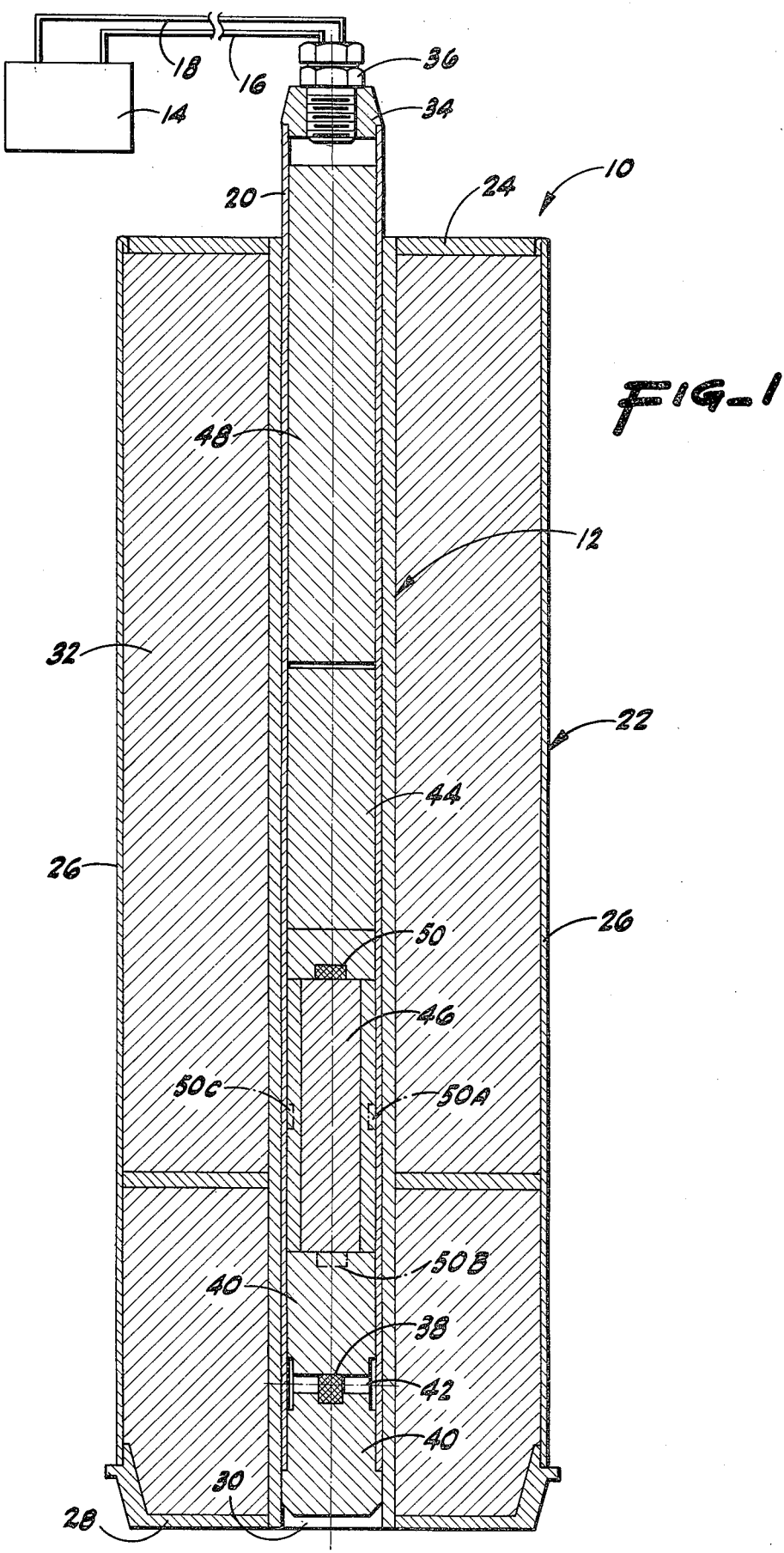
FIG. 1 is a sectional view of the probe of the gauge of the present invention and a schematic rendition of a means for receiving signals from the probe and transforming the same into moisture and density data.

For a better understanding of the invention, reference is made to the following detailed description which should be referenced to the hereinabove described drawings.

DESCRIPTION OF THE PREFERRED EMBODIMENTS

Various aspects of the present invention will evolve from the following detailed description of the preferred embodiments thereof which should be taken in conjunction with the herein above described drawings.

The invention as a whole is represented in the drawings by reference character 10. The moisture and density gauge 10 includes a probe 12, which is intended for lowering into a medium such as soil. Gauge 10 includes means 14 for receiving signals via cables 16 and 18 and transforming the received signals into a representation of the moisture and density of the medium within which probe 12 is lowered. Means 14 may include dual channel electronics having display capabilities such as that shown in the MC-2 series display electronics manufactured by CPN Corp. of Pacheco, California. Probe 12 includes a casing 20, which may be constructed of metallic material. As shown in FIG. 1, casing 20 is of cylindrical configuration and is shown surrounded by a protective shipping container 22, having top portion 24, sides 26, and bottom 28. Opening 30 in bottom 28 permits casing 20 to move outwardly therefrom. Normally, casing 20 would be lowered into a void in the medium being analyzed such as a soil. It is common practice to drill a hole in the soil being analyzed and line the opening with a tube or case.

Shipping container 22 includes shielding material such as a wax-plastic-lead mixture.

Casing 20 includes a cap 34 which includes a plug 36 threadingly engagable with cap 34. Source 38 may be a source of gamma radiation as well as a source of gamma and neutron radiation, a combined source. Cesium 137 may be employed as a source of gamma emission. Americium 241/Berylium is commonly used for neutron emission. Where a combined source is used Radium 226/Berylium provides both gamma and neutron emission. Shield 40 surrounds source 38 to prevent gamma radiation from passing outside of casing 20. An aperture 42 directs the gamma emission or radiation laterally in relation to the length of casing 20.

A gamma radiation detector 44 is also located within casing 20 at the required distance from radiation source 38. Such gamma radiation detector may be a Geiger-Mueller tube manufactured by TGM, Inc., Waltham, Mass. Detector 44 is located the required distance from radiation source 38 to achieve Gamma radiation backscatter measurements from source 38. As is known in the art, Geiger-Mueller tube 44 relays a signal to means 14 for an indication of the density of the medium being tested. Between gamma radiation source 38 and gamma radiation detector 44 is located a neutron radiation detector 46. As is known in the art, neutron radiation detectors may take the form of boron trifluride or helium three-tubes such as the type manufactured by LND Corp. of Oceanside, New York. Likewise, neutron radiation detector indicates the amount of moisture, in the form of hydrogen, found in the soil or medium surrounding casing 20. As may be apparent, both gamma radiation and neutron radiation detectors 44 and 46 transmit signals to means 14 for display. Means 14 is typically found on the upper surface of the soil being tested and is visible to the operator of the device 10. A preamplifier 48 may be placed within casing 20 and lowered into the medium with the gamma and neutron detectors 44 and 46.

Although source 38 is a combined source of neutron and gamma radiation or emission, neutron source 50 may be separated leaving source 38 as a purely gamma radiation source. Neutron radiation source 50 may be placed in several locations designated on FIG. 1 by reference characters 50A, 50B, and 50C. Ideally, neutron and gamma radiation sources should be within three inches of one another in casing 20. If such is the case, casing 20 may be lowered into the medium to a single depth and backscatter readings for neutron and gamma radiation, representative of moisture and density readings, may be obtained without further movement of casing 20 and the components lying therewithin.

In operation, the user places probe 12 over an opening in the medium with the components arranged as shown in FIG. 1. Casing 20 is lowered into the medium at a certain depth where moisture and density determinations are desired. Preamplifier 48 and means 14 are activated which results in detectors 44 and 46 transmitting signals to preamplifier 48 and then to means 14 at the surface of the medium. Means 14 transforms and receives signals through cables 16 and 18 into the desired type of data which may include a visual readout.

While in the foregoing embodiments of the present invention have been set forth in considerable detail for the purposes of making a complete disclosure of the invention, it may be apparent to those of ordinary skill in the art that numerous changes may be made in such details without departing from the spirit and principles of the invention.

What is claimed is:

1. A moisture and density gauge for a medium having, in combination, a source of gamma radiation, a source of neutron radiation, and means for receiving signals and transforming the received signals into a representation of the moisture and density of the medium, the improvement comprising:
   a. a casing, the gamma radiation and neutron radiation sources being placed in said casing, said casing intended for being placed in the medium;
   b. means for detecting and signaling the gamma radiation emanating from the source of gamma radiation after interaction with the medium, said means for detecting and signaling the emanation of gamma radiation being placed in said casing;
   c. means for detecting and signaling the neutron radiation from said source of neutron radiation after interaction with the medium, said means for detecting and signaling the radiation of neutrons after interaction with the medium being placed in said casing between said means for detecting and signaling the gamma radiation and the source of gamma radiation, said signals representing the detected neutron and gamma radiation being transmitted to the means for receiving signals.

2. The moisture and density gauge of claim 1 which additionally comprises a gamma radiation shield placed within said casing and substantially surrounding the source of gamma radiation, said gamma radiation shield including an aperture.

3. The moisture and density gauge of claim 1 which includes means for placing the source of neutron radiation immediately adjacent the source of gamma radiation.

4. The moisture and density gauge of claim 1 which includes means for placing the source of neutron radiation adjacent said means for detecting and signaling the radiation of neutrons.

5. The moisture and density gauge of claim 1 in which said means for detecting and signaling the gamma radiation emanation includes a Geiger-Mueller tube.

6. The moisture and density gauge of claim 1 in which said means for detecting the radiation of neutrons includes a boron trifluoride tube.

7. The moisture and density gauge of claim 1 in which said means for detecting the radiation of neutrons includes a helium three tube.

8. The moisture and density gauge of claim 1 which additionally comprises means for amplifying said signals from said means for detecting and signaling the gamma radiation and neutron radiation from the sources, said amplifying means being located within said casing.

9. A method for simultaneously obtaining moisture and density readings in a medium comprising the steps of:
   a. placing a neutron radiation detector in a casing between a source of gamma radiation and a gamma radiation detector;
   b. placing a source of neutron radiation within the casing at substantially the same level in the casing as the source of gamma radiation;
   c. lowering the casing into the medium to a certain depth;
   d. transmitting said signals to the vicinity of the surface of the medium;
   e. transforming said signals into a measure of the moisture and density of the medium.

* * * * *